Figure 1:
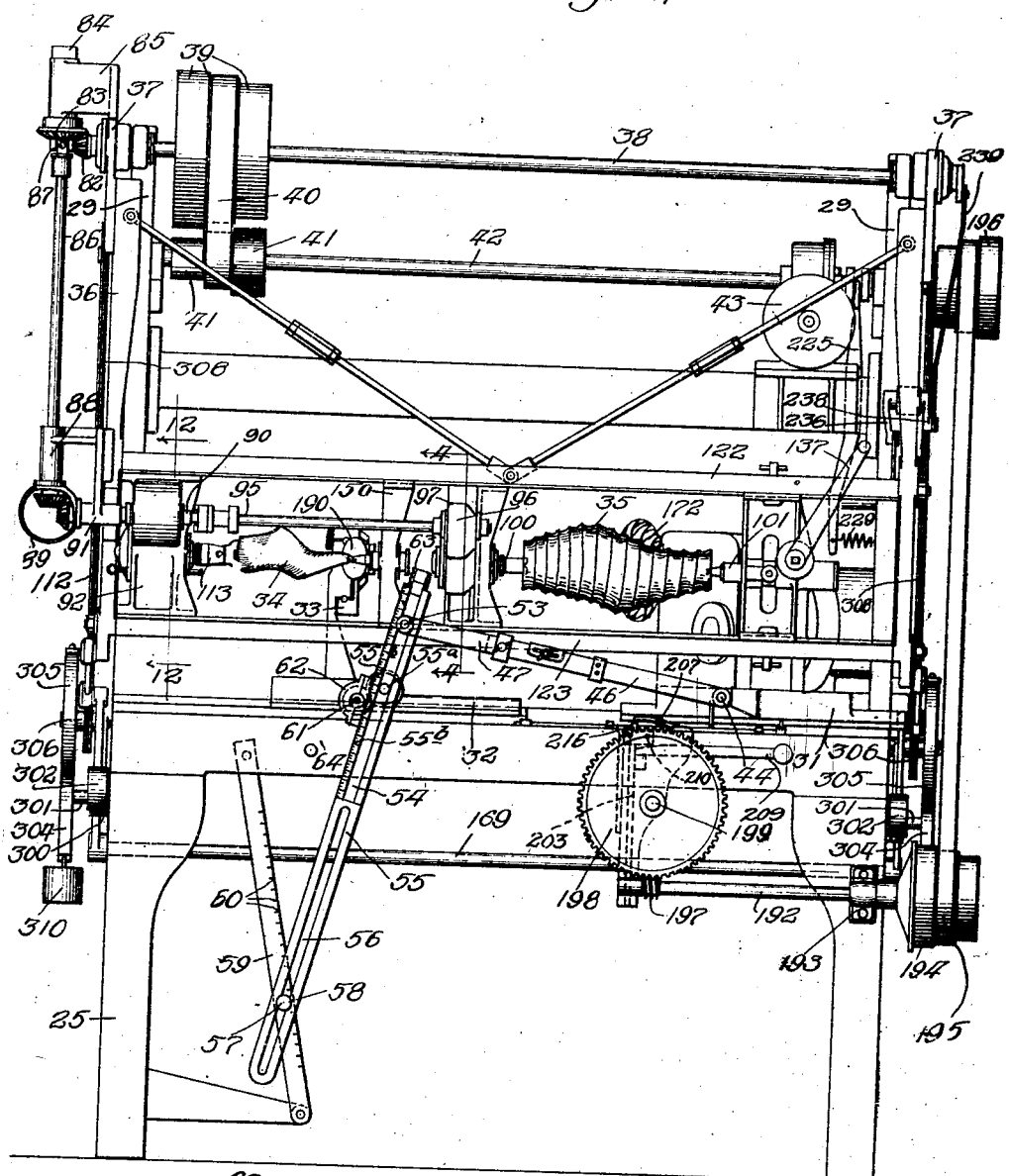
Figure 1A:
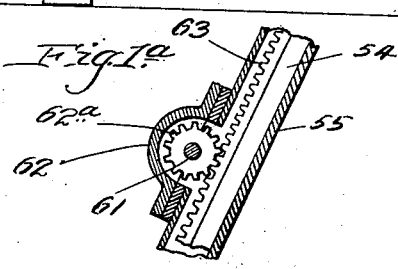

Sept. 11, 1928.

C. E. REED 1,684,072

LATHE

Filed July 7, 1923

11 Sheets-Sheet 1

Inventor
Charles E. Reed,
By Dyrenforth, Lee, Chritton & Wiles,
Attys.

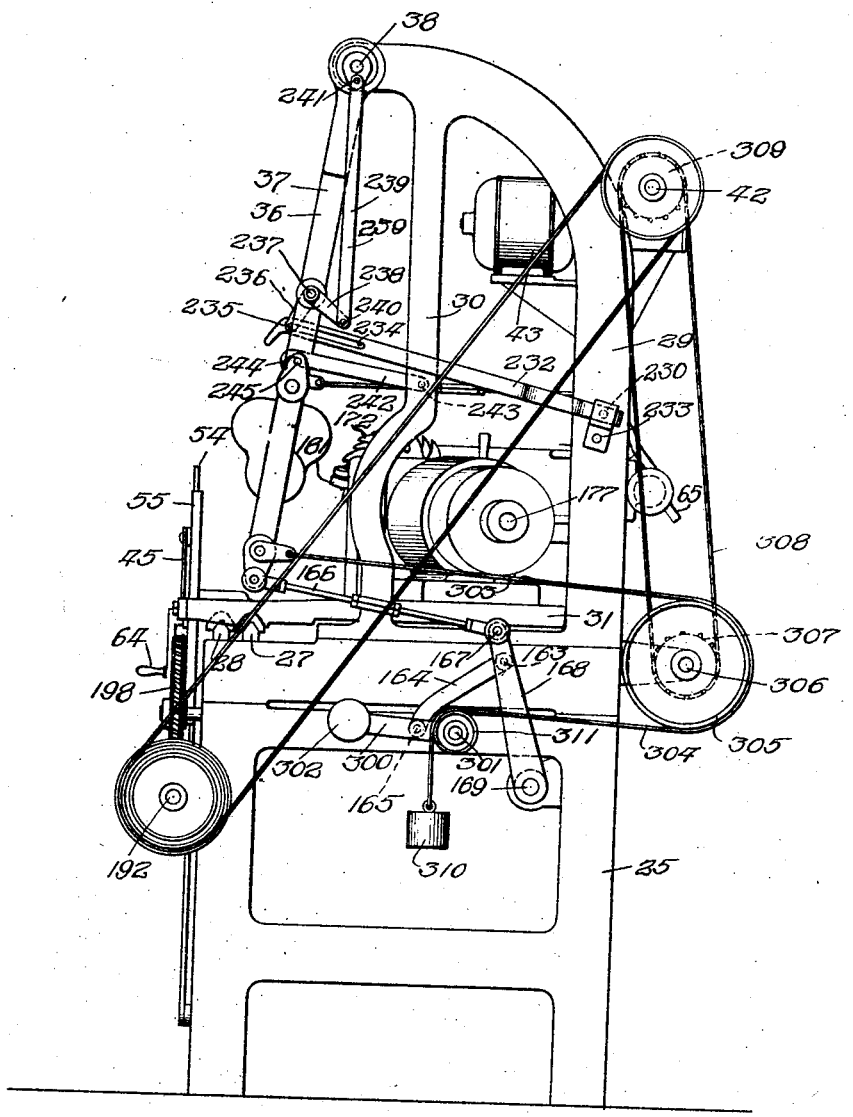

Sept. 11, 1928.
C. E. REED
LATHE
Filed July 7, 1923
1,684,072
11 Sheets-Sheet 3
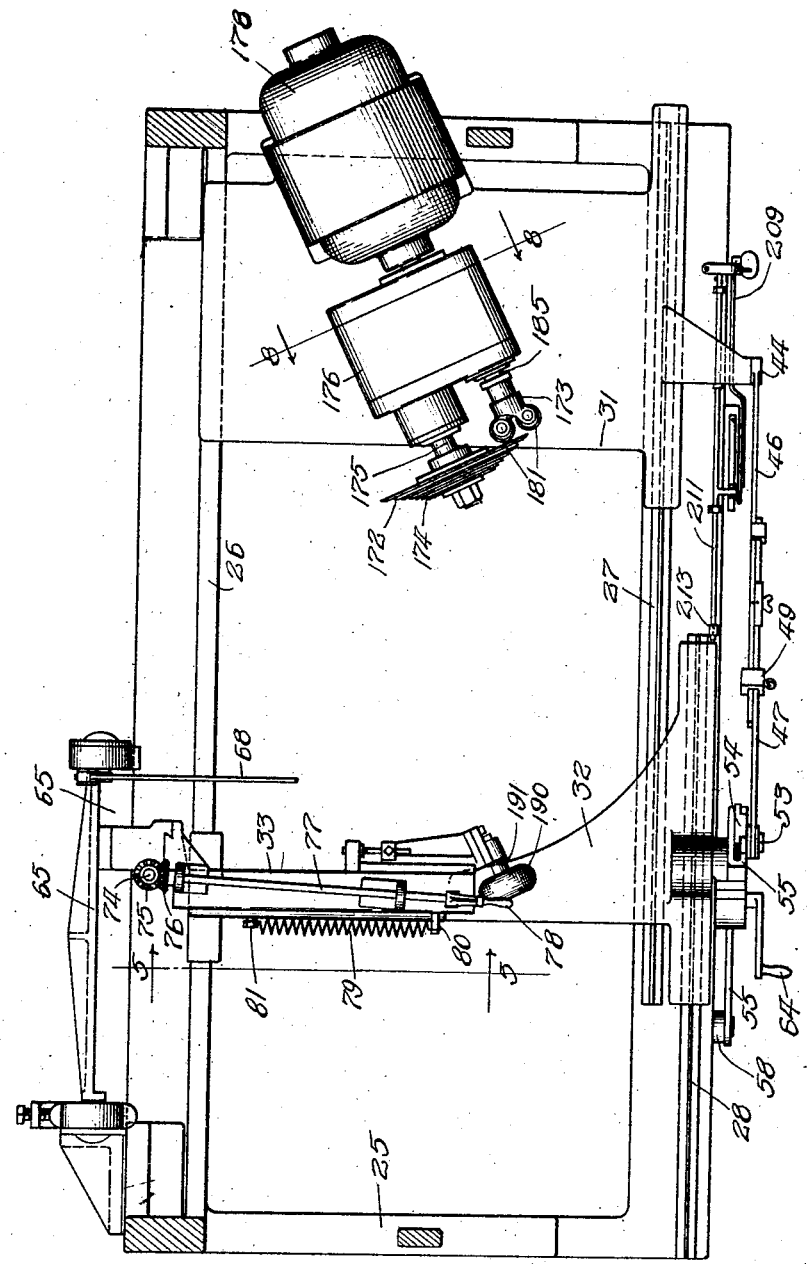
Inventor:
Charles E. Reed,
By Dynaforth, Lee, Chritton & Wiles,
Attys.

Sept. 11, 1928.

C. E. REED

LATHE

Filed July 7, 1923

1,684,072

11 Sheets-Sheet 4

Inventor:
Charles E. Reed,
By Dynnforth, Lee Chritton, Wiles
Attys.

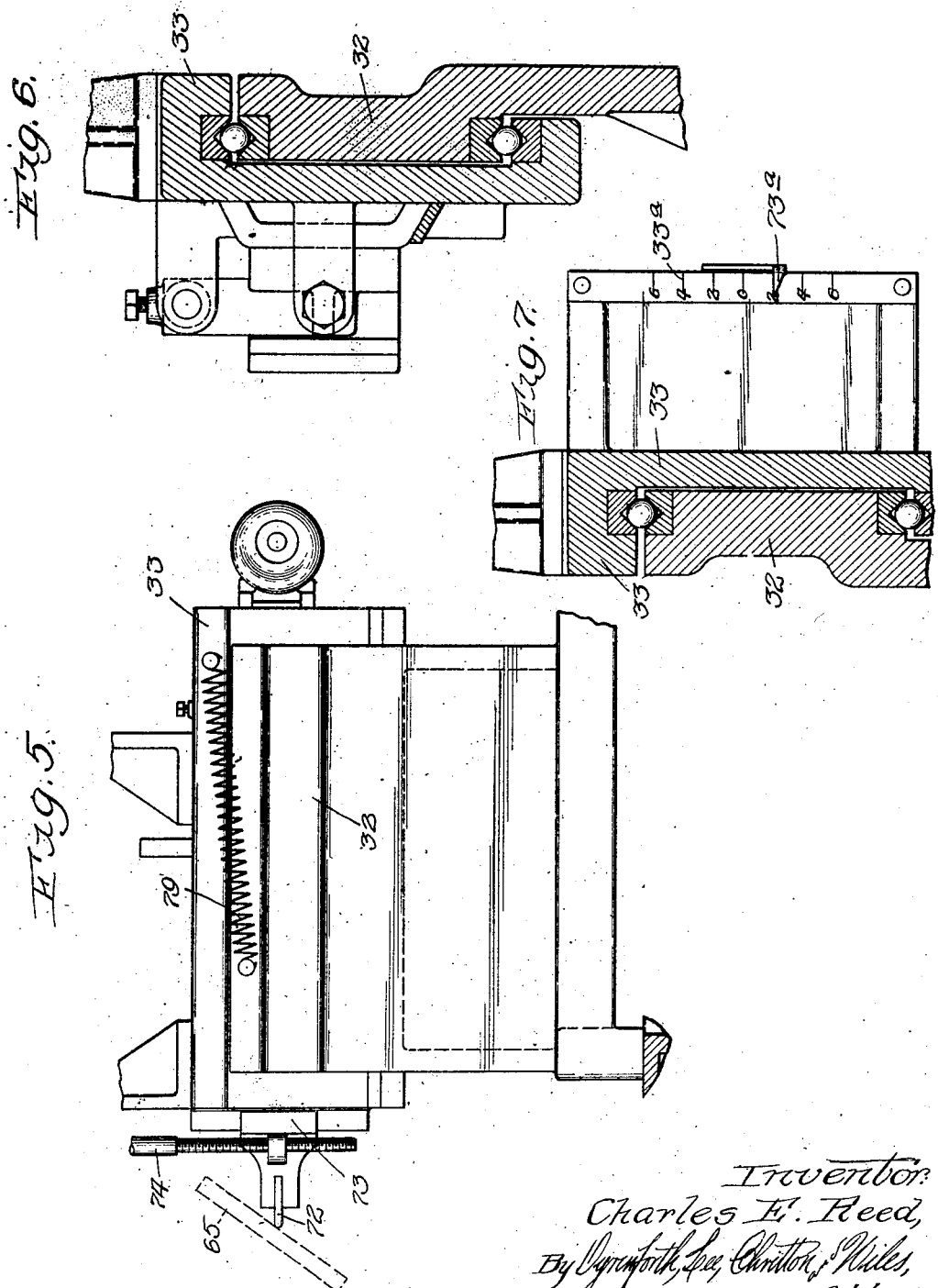

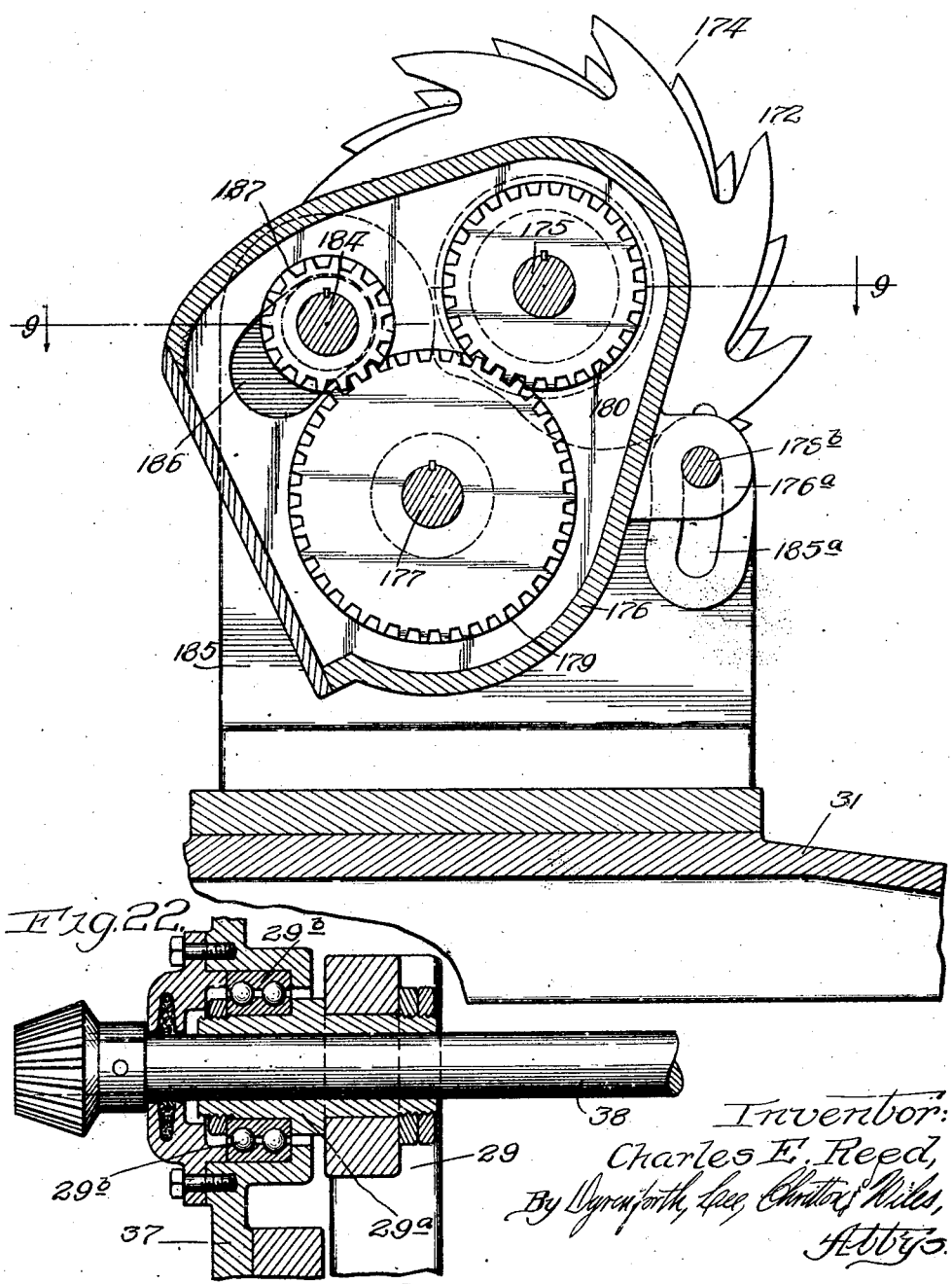

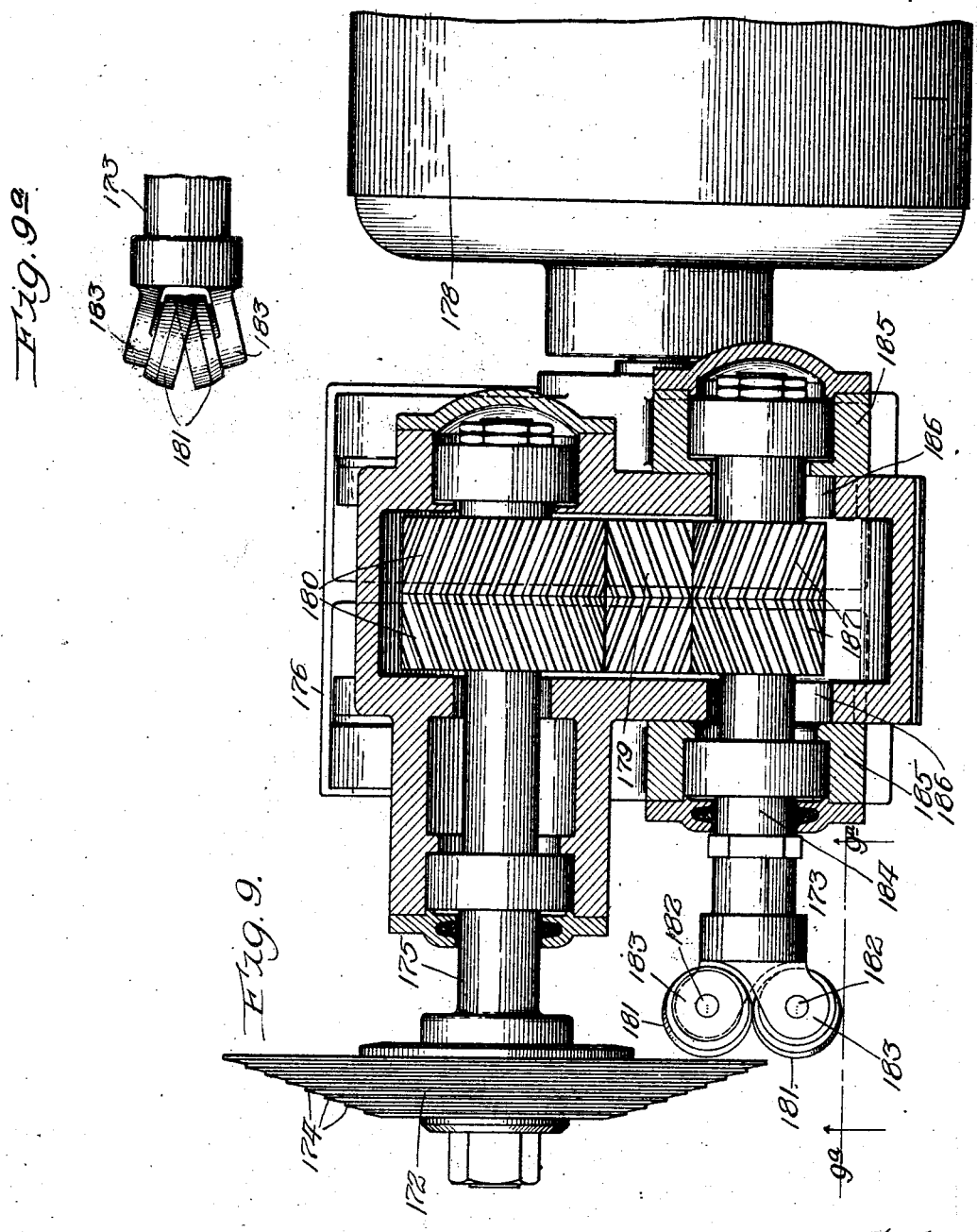

Sept. 11, 1928.　　　　　C. E. REED　　　　　1,684,072
LATHE
Filed July 7, 1923　　　11 Sheets-Sheet 8
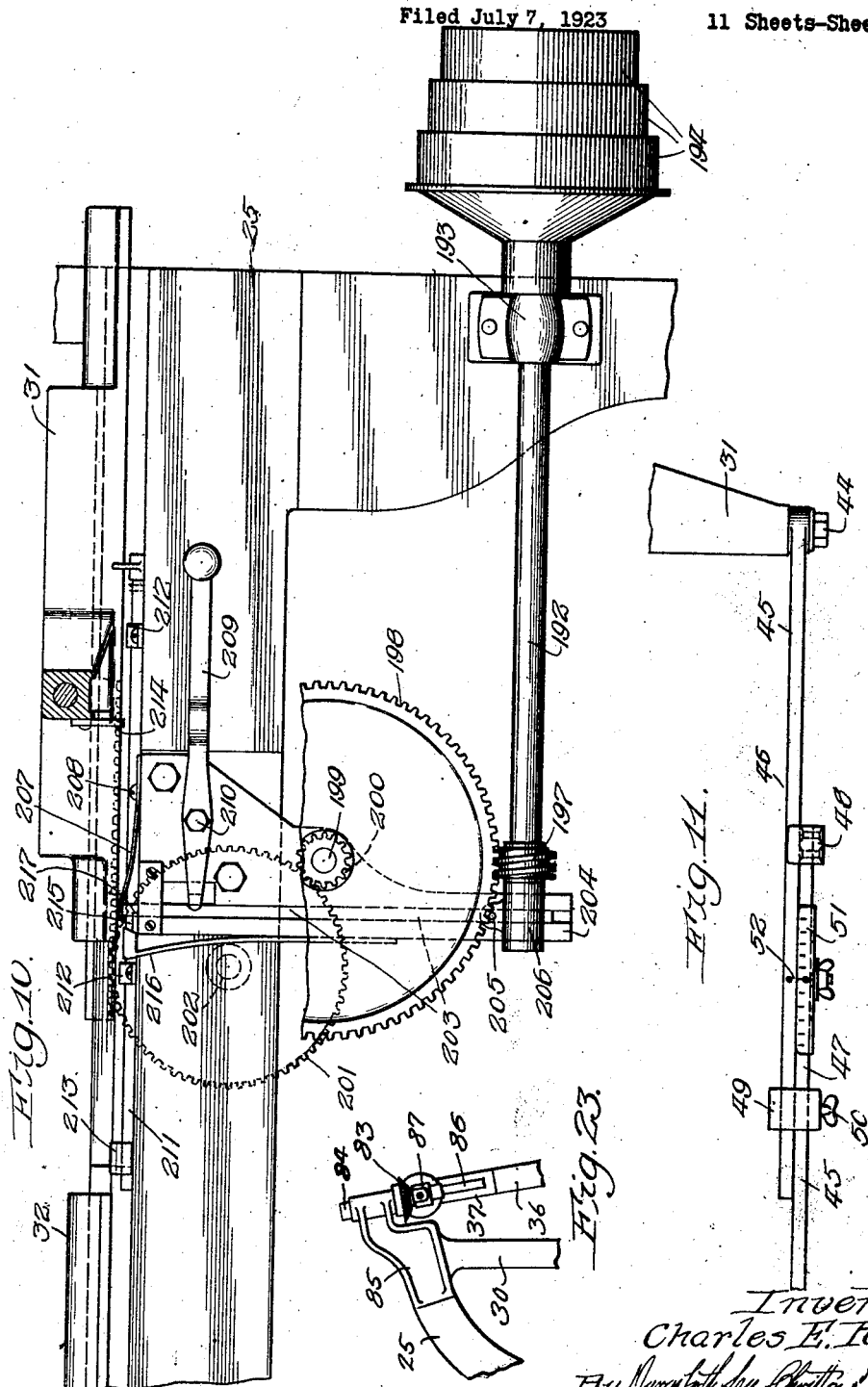
Inventor:
Charles E. Reed,
By Dynaforth, Lee, Chritton, & Wiles,
Attys.

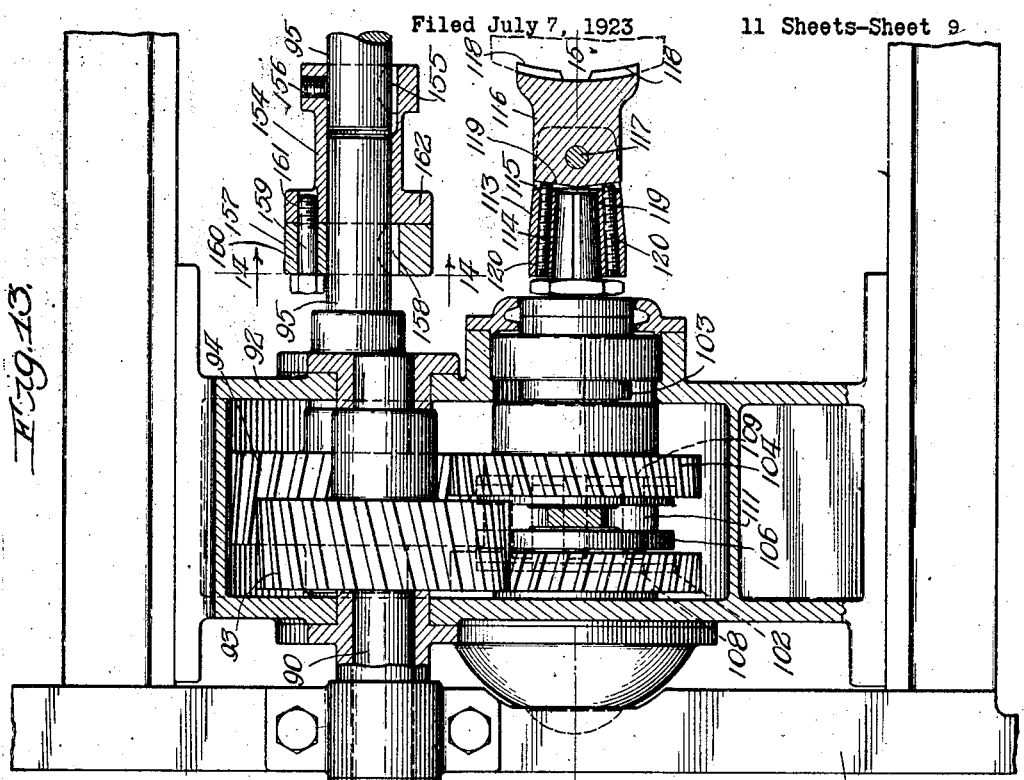

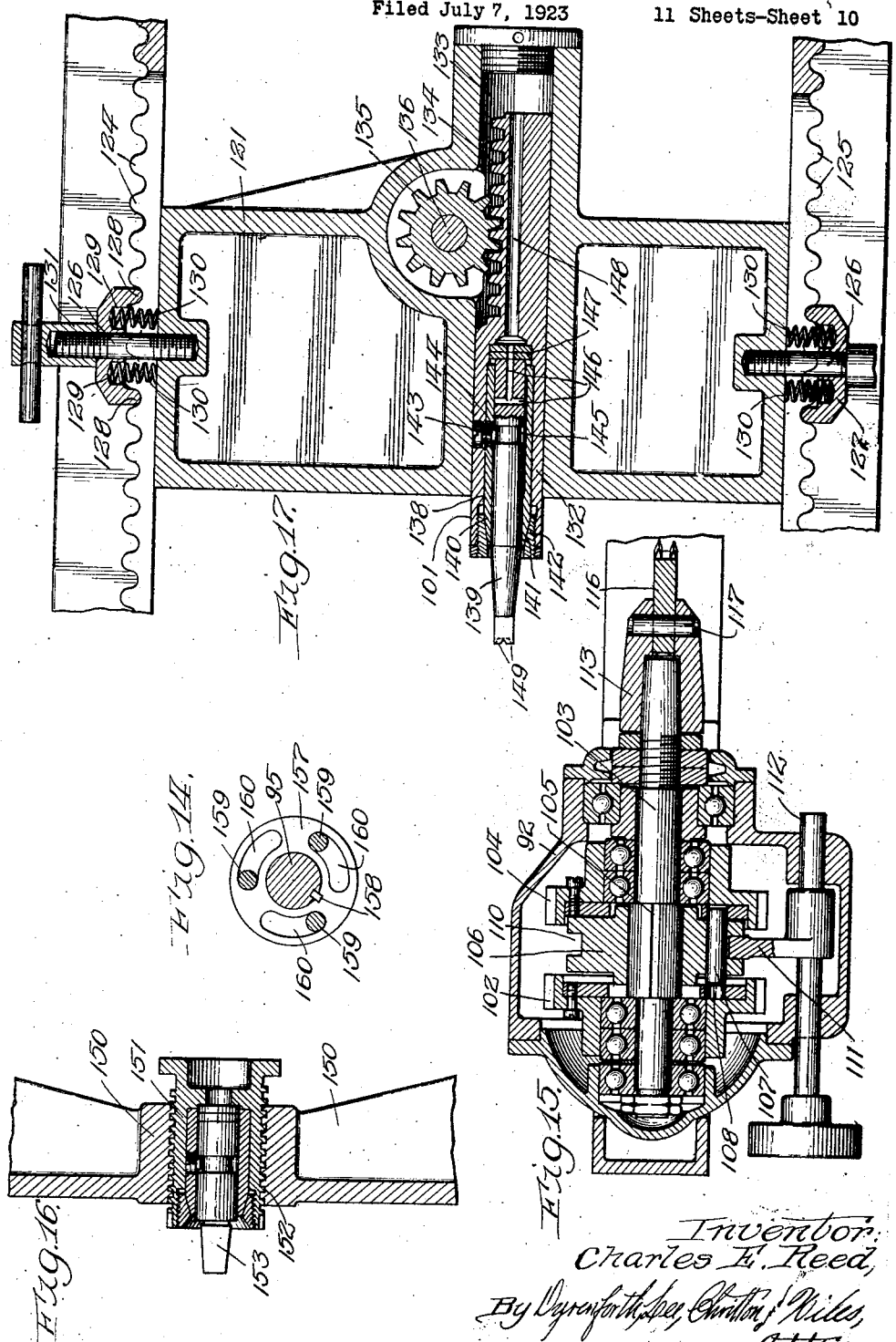

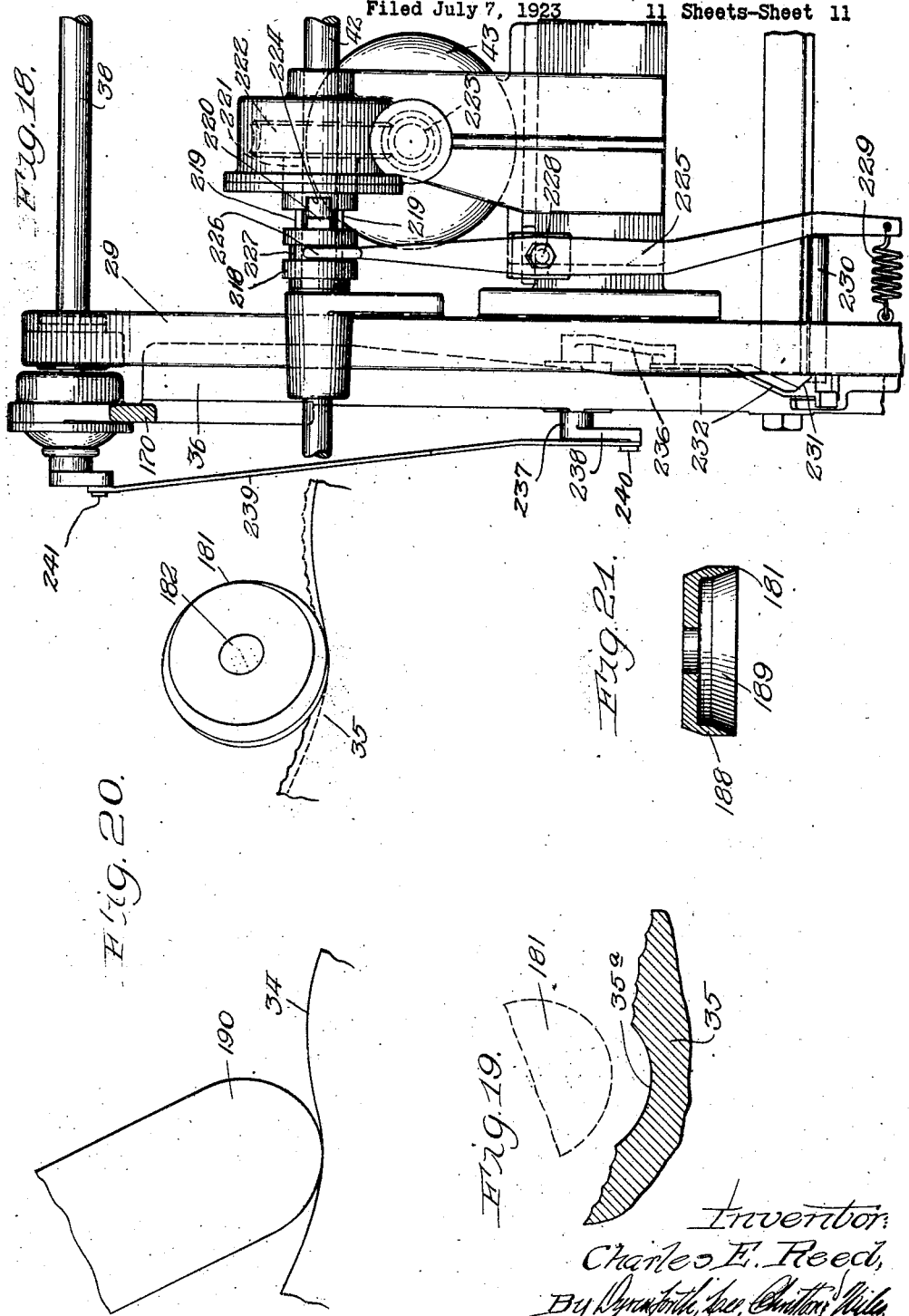

Patented Sept. 11, 1928.

1,684,072

UNITED STATES PATENT OFFICE.

CHARLES E. REED, OF McHENRY TOWNSHIP, McHENRY COUNTY, ILLINOIS.

LATHE.

Application filed July 7, 1923. Serial No. 650,194.

My invention relates, more particularly, to copying lathes which operate automatically to form an object, as, for example, a wood blank, into the same shape as a preformed pattern, though my invention is not limited, as to certain phases thereof, to so-called copying lathes.

One of my objects is to provide, in a copying lathe for the manufacture of shoe lasts especially of the type employing a swing frame on which the pattern and the work are rotatably mounted and the frame oscillates by virtue of the rotation of the pattern against a stationary pattern follower, for the production of accurate right and left lasts, whether graded or otherwise, by the reversal of rotation of the pattern and the work, the right-hand last being made by rotating the pattern in the same direction as the work, and the left-hand last being made by rotating the pattern in the opposite direction to the rotation of the work.

Another object is to provide an improved construction of reverse gear mechanism wherein shifting of the gears is avoided, for use more especially in connection with a copying lathe provided for the manufacture of right and left lasts from a single pattern.

Another object is to provide in a copying lathe of the swing frame type for the exertion of the pattern against the pattern follower with a substantially uniform and constant force, regardless of the angle to which the swinging frame extends in the oscillating movements of the latter.

Another object is to provide in a copying lathe, especially for the production of lasts of different sizes from a single pattern, a scale so located and co-related to relatively movable parts of the grading mecahnism, that the parts of the grading mechanism may be accurately set to correct errors which would otherwise occur in the use of the machine for making lasts of different shapes and whereby once an adjustment is made for a given shape of last, the adjustment may be maintained regardless of the conditioning of the machine for producing lasts of different lengths.

Another object is to provide a lathe dog which shall be adapted for use in connection with different shapes of heels, in the turning of lasts; and other objects as will be manifest from the following description.

Another object is to provide against rebounding of the swinging frame even when the machine is operated at relatively high speed.

It may be stated, in connection with the above-recited advantage presented by my improvements in the manufacture of right and left hand lasts from a single pattern, by reversing the rotation of the pattern and work, that as machines have hitherto been constructed it is impossible to produce a last reversed as to form as compared with the pattern, as, for example, a left-hand last from a right-hand pattern, or vice versa, due to the fact that upon the reversal of the mechanism a certain amount of twist develops which produces an undesirable variation between the pattern and the last, this objectionable twist being avoided, and the rights and lefts produced being exactly the same except they are reversed, by employing my improvements.

Figure 4:
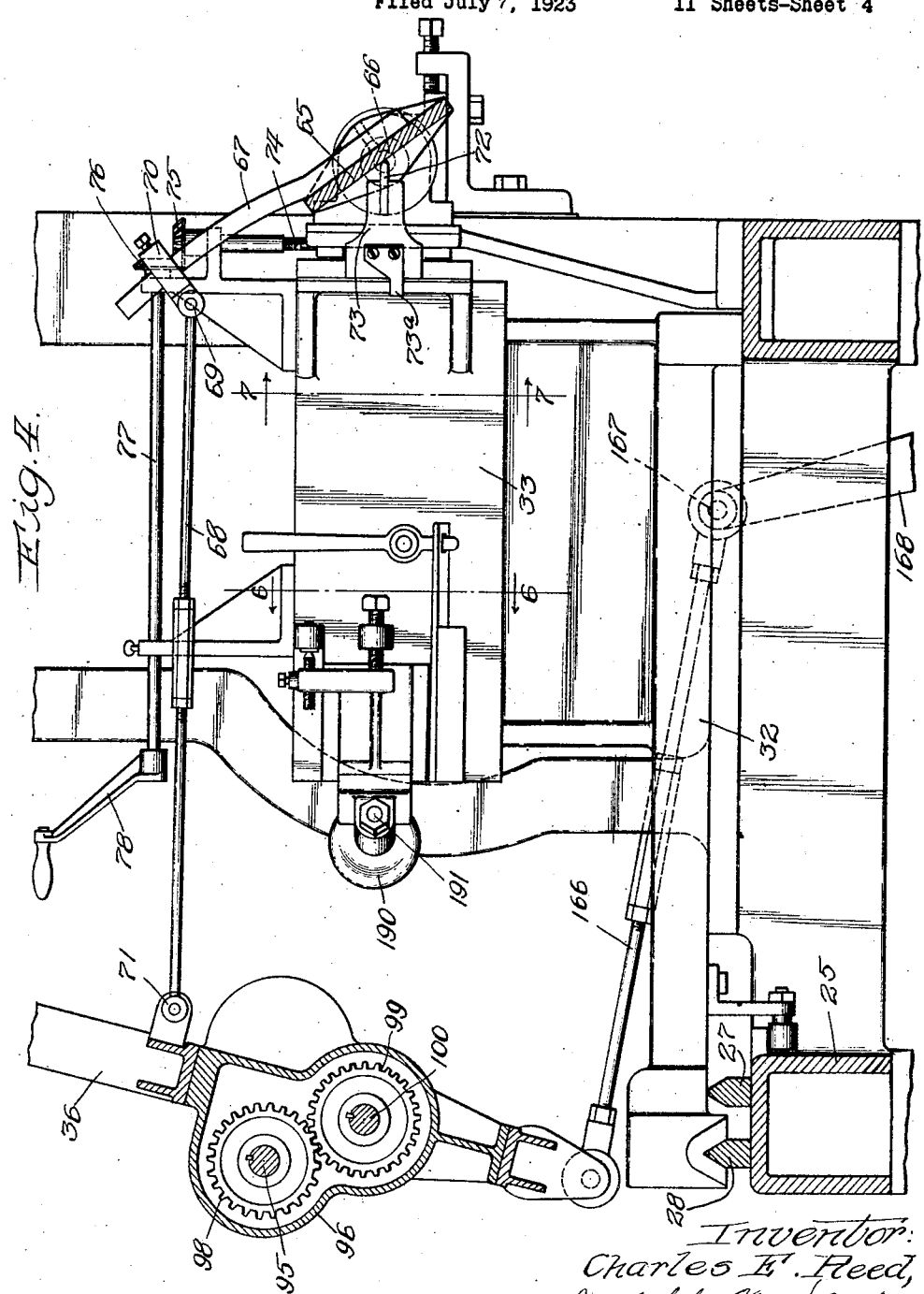

Referring to the accompanying drawings, in which I have illustrated my invention as embodied in a copying lathe for producing lasts in conformance with a pattern, with the lasts graded in size as desired:

Figure 1 is a view in front elevation of the said machine. Fig. 1ª is a broken sectional view of a portion of one of the grading levers. Figure 2 is an end view thereof, viewing the machine from the right hand end in Fig. 1. Figure 3 is a plan view of the machine with the upper works thereof shown in section and the swinging frame removed. Figure 4 is an enlarged section taken at the line 4—4 on Fig. 1 and viewed in the direction of the arrows. Figure 5 is an enlarged section taken at the line 5—5 on Fig. 3 and viewed in the direction of the arrows. Figure 6 is an enlarged section taken at the line 6—6 on Fig. 4 and viewed in the direction of the arrows. Figure 7 is an enlarged section taken at the line 7—7 on Fig. 4 and viewed in the direction of the arrows. Figure 8 is an enlarged section taken at the line 8—8 on Fig. 3 and viewed in the direction of the arrows. Figure 9 is a section taken at the line 9—9 on Fig. 8 and viewed in the direction of the arrows. Figure 9ª is a broken view in front elevation of the finishing cutters, the view being taken at the line 9ª—9ª in Fig. 9 and viewed in the direction of the arrows. Figure 10 is an enlarged front view of a detail of the machine showing mechanism whereby the feed for the pattern follower and cutting mechanism is automatically arrested upon the conclusion of the cutting operation. Figure 11 is a broken plan view of a detail of the adjustable connection between the relatively adjustable sections of the carriage on which the pattern follower and cutting mechanism are mounted and which adjustment is brought into play in the setting of the machine for the production of different shapes of lasts. Figure 12 is an enlarged section taken at the line 12 on Fig. 1 and viewed in the direction of the arrows. Figure 13 is a section taken at the irregular line 13—13 on Fig. 12 and viewed in the direction of the arrows. Figure 14 is a section taken at the line 14—14 on Fig. 13 and viewed in the direction of the arrows. Figure 15 is a section taken at the line 15 on Fig. 13 and viewed in the direction of the arrows. Figure 16 is a view in vertical sectional elevation of the tail stock for the pattern. Figure 17 is a similar view of the tail stock for the last, showing the manner of supporting the same in adjusted position. Figure 18 is a view in elevation of the portion of the machine at which the mechanism for automatically stopping the driving means for the mechanism which rotates the pattern and last is located, the view being a rear view of that part of the machine which is located at the right hand side of Fig. 1. Figure 19 is a view in the nature of a diagram illustrating the contour of the cut produced by the cutting mechanism. Figure 20 is a view in the nature of a diagram of a portion of a pattern and a last being formed to shape, together with a pattern follower and one of the cutters, these several parts being shown in the relative positions they occupy in the operation of the machine and illustrating the provision of the pattern follower of such cross-sectional contour, where it engages the pattern, as to correspond with the contour of the cut produced by the cutting mechanism. Figure 21 is a longitudinal sectional view of one of the similar cutters employed. Figure 22 is a broken section in vertical elevation of the swing frame and driving mechanism therefor at the left-hand end of Fig. 1; and Figure 23, a fragmentary view in end elevation of the machine.

The particular illustrated construction of machine comprises a frame 25 provided adjacent its rear side with a guide-way 26 extending longitudinally thereof, and adjacent its front side with upwardly-extending parallel guide-ways 27 and 28 arranged in overlapping relation as shown in Figs. 2 and 3, the frame being provided at its opposite ends above these guide means with upwardly-extending standards 29 having forwardly-curved extremities and brace members 30. Mounted on the guide-ways 26 and 27 is a slide 31 which carries the cutting mechanism hereinafter described, this slide being adapted for movement lengthwise of the machine; and mounted on the guide-ways 26 and 28 is a slide 32 likewise movable in a direction lengthwise of the machine. The slide 32 is provided with guides, extending crosswise of the machine, on which a slide 33 is mounted to be movable longitudinally thereon, this last-referred-to slide carrying the pattern follower hereinafter described.

The pattern, which is in the form of a last, represented at 34, and the wood blank from which a last is to be formed, and represented at 35, are rotatably supported in a swinging frame 36 journaled at the upper ends of its side arms 37 on the frame standards 29 at hollow trunnions 29$^a$ (Fig. 22) secured in the upper ends of the standards 29, ball bearings 29$^b$ being confined between these trunnions and the journal portions of the frames 36. The trunnions 29$^a$ form journals for a shaft 38 extending therethrough and carrying the stepped pulleys 39 through the medium of which it is driven to rotate the last 34, and work 35, as hereinafter described, by belt-connection 40 with other belt pulleys 41 secured to a drive-shaft 42, which latter is driven by a motor represented at 43. The pattern 34 and blank 35, rotated in unison on the frame 36 by mechanism hereinafter described, cooperate with the pattern-follower and cutting mechanism hereinbefore referred to, the pattern 34 bearing against the pattern-follower at all times, whereby in the rotation of the pattern the frame is caused to oscillate by virtue of the rotation of the pattern against the follower, to the end that the blank 35 will, in its rotation, be cut to present the same form as the pattern, the pattern-follower and cutting mechanism being gradually moved in a direction lengthwise of the pattern and work to produce the desired feed.

To effect simultaneous movement of the slides 31 and 32 in a direction lengthwise of the machine, namely, to the left in Fig. 1, during the operation of producing a last, and to cause, under the control of the operator, a last to be formed of the exact size of the pattern-last 34, or of a greater or less length, as desired, the slide 31 (Fig. 3) has pivotally connected therewith, as indicated at 44 (Fig. 11), a bar 45 formed of flatwise-opposed bar-sections 46 and 47 which are relatively longitudinally adjustable to vary the effective length of the bar 45, the section 46 to this end being provided with a fork-section 48 in which the bar-section 47 is slidably adjustable; and the overlapping ends of the sections 46 and 47 are surrounded by a clamp 49 having a set-screw 50 for holding these bar-sections in adjusted position, the bar-section 47 being shown as provided with a scale 51 cooperating with a pointer 52 on the section 46 for a purpose hereinafter described. The end of the bar 45 opposite that at which it connects with the slide 31, is pivotally connected, as indicated at 53 (Fig. 1), with the upper end of a rack bar 54 slidable up and down in a bar 55 slotted at its lower end, as indicated at 56, through which slot the pivoting stud 57 of a clamping-device 58 carried by a stationary bar, and slidable up and down on the latter, extends, the bar 59 being rigidly connected at its opposite ends with the frame of the machine, as shown, and presenting a scale 60 on its front face. The bar 55 is pivotally supported on the slide 32 through the medium of a pivot 55$^a$ and carries a gear case 62 containing a pinion 62$^a$ which meshes with the teeth 63 on the rack bar 54, the pinion referred to being rigidly secured to a shaft 61 journaled in the gear case 62 and provided with a crank-handle 64 through the medium of which the pinion may be rotated to adjust the bar 54 lengthwise of the bar 55. The arrangement whereby the slides 31 and 32 are connected together, as stated, except for the scale 51 and the particular means shown for adjusting the bar 54, is that commonly provided in last-grading machines, as hitherto constructed, it being understood that by varying the relatively movable members forming the connecting mechanism described, the slides 31 and 32 may be moved at the same speed for the production of a last of the same length as the pattern, or at different speeds, to produce longer or shorter lasts, as desired.

The machine shown is provided with means, as commonly provided in machines of this type, for causing the last to be of the same cross-sectional shape and width as the pattern, or graded to produce different widths, either smaller or larger than the pattern, the means shown for this purpose comprising a plate 65 (Fig. 4) provided with trunnions 66 at its opposite ends, and between its upper and lower edges, at which it is supported on the frame of the machine to rock upon a horizontal axis, the plate 65 being provided with an upwardly-extending arm 67 pivotally connected with the rear end of a rod 68, as represented at 69, through the medium of a clamp 70 carrying this pivot and adjustable up and down on the arm 67, the forward end of the rod 68 being pivotally connected with the swinging frame 36, as represented at 71. The plate 65 is provided for cooperation with the rear end of the slide 33, the point of engagement between these parts being at a plate 72 extending rearwardly from the slide 33 (Fig. 4) and mounted in a block 73 vertically adjustable on the slide 33. The block 73 has threaded engagement with a vertically-disposed shaft 74 carrying a bevel gear 75 meshing with a bevel gear 76 provided on a shaft 77 carrying a crank handle 78 at its front end through the medium of which the shaft 77 may be rotated to raise or lower the block 73 as desired.

The slide 33 is caused to bear at the plate 72, at all times, against the front face of the plate 65, through the medium of a spring 79 which is connected at its forward end with a stud 80 on the slide 33, and at its rear end with a stud 81 on the slide 32. The oscillatory movements of the swinging frame 36 produced by the rotation of the pattern 34 against the follower operate to rock the plate 65. When the block 73 is adjusted to the position shown in Fig. 4 wherein it coincides with the axes of the trunnions 66, no movement of the slide 33 occurs, but if the block 73 is adjusted either above or below the axes of these trunnions, the slide 33 will be given a movement responsive to the rocking movements of the plate 65. If the adjustment of the block is above the axes, it will cause the width of the last produced to be greater than the width of the pattern-last 34, and if the block 73 extends below the axes it will produce a last of less width than the pattern last, the block 73 being provided with a pointer 73$^a$ cooperating with a scale 33$^a$ to determine the position to which the shaft 77 should be rotated for producing the width of last desired.

The mechanism for supporting, and simultaneously rotating, the pattern last 34 and the blank 35, at the same speed, comprises a bevel gear 82 (Fig. 1) carried on one end of the shaft 38 and meshing with the bevel gear 83 provided on a shaft 84 journaled in a bracket 85 provided on one of the frame sides 25, the shaft 84 being connected with the upper end of a shaft 86, through the medium of a universal joint 87, the fulcrum point of this joint being centered with the axis of the shaft 38. The lower end of the shaft 86 is journaled in a bearing 88 extending from a gear case 89 mounted on the lower end of one of the frame sides 37, the lower end of the shaft 88 carrying a bevel gear (not shown) meshing with a bevel gear (not shown) secured to a shaft 90 (Figs. 12 and 13) journaled in a bearing 91 extending from the gear case 89, in which gear-case the bevel gears last referred to are located. The shaft 90 extends through a gear-case 92 and carries a spiral gear 93 located in said case and meshing with a spiral gear 94 located in said case and carried by a shaft 95 which extends lengthwise of the frame and is journaled in a gear-case 96 secured to a cross-piece 97 of the frame 36, this shaft carrying a gear 98 located in the case 96 and meshing with a gear 99 (Fig. 4) also located in this case and rigidly secured to the head-stock spindle 100 (Fig. 1) between which and a tail-stock spindle 101 the blank 35 extends, and by which the blank is held. The gear 93 which only partially overlaps the periphery of the gear 94, meshes with a spiral gear 102 journaled on a shaft 103 (Fig. 13) rotatably mounted in the gear-case 92, the shaft 103 also carrying a spiral gear 104 journaled thereon meshing with the gear 94. Located between the gears 102 and 104 and splined on the shaft 103, as represented at 105, is a clutch-disk 106 (Figs. 12, 13 and 15) provided with a series of pins 107 rigidly secured therein each to extend beyond the opposite faces of the disk, these pins, which are grouped about the axis of the disk, being non-equidistantly spaced apart and adapted to enter correspondingly-disposed openings 108 and 109 in the sides of the gears 102 and 104. The parts just described are so proportioned and arranged that when the clutch-disk 106 which, it will be understood, rotates with the shaft 103, is in clutching engagement with one of the gears 102 and 104, it is unclutched from the other thereof and vice versa, this construction permitting of the driving of the shaft 103 from the gear 93 and 102 for rotating it in the same direction as the shaft 95, or driving it from the gears 93, 94 and 104 for rotating the shaft 103 reversely to the direction of rotation of the shaft 95. The clutch-disk 106 is shown as preferably grooved, as represented at 110, to receive a yoke-shaped shifting device 111 mounted on a rod 112 lengthwise slidable in the gear case 92.

The reversing gear provided, as stated, permits of the use of inclined-tooth gears for the transmitting of power to the spindles of the head-stocks, which is very desirable where highly synchronized action of rotatable elements, as, for example, in a copying lathe, is desired, it being noted that this reversing mechanism does not involve any shifting of gears, which is impossible in the case of inclined-tooth gears, but merely involves the shifting of clutch mechanism.

As will be understood from the foregoing, the reverse gear is provided for the purpose of adapting the machine for the making of both right and left hand lasts from a single pattern, without requiring that the latter be disturbed, merely by causing the pattern 34 to rotate in one direction or the other, depending upon whether a right or left hand last is to be made. In this connection the feature of providing the universal joint 87 centered relative to the shaft 38 as stated and thus concentric with the pivoted support for the swinging frame 36, is of great importance, inasmuch as the movement of the driving mechanism for the head-stocks of the pattern and blank is neither accelerated to a material degree nor decelerated in the swinging of the frame 36, as distinguished from prior structures wherein the drive is so constructed that when the frame is swung it produces material deceleration or acceleration of the head-stock-driving mechanism and causes such material differential movement of the head-stocks as to result in the production of a twisted last. In this connection it may be stated that while the speed of the pattern and work rotating mechanism is accelerated or decelerated in the swinging of the frame due to the slight angular change of the frame, such variation in speed is very small compared with the devices heretofore used, and is so nearly negligible as to not render the speed of the pattern and work rotating mechanism non-uniform to an objectionable extent from a practical standpoint.

The head-stock spindle for the pattern 34, and comprising the shaft 103, is provided with a dog-device having teeth adapted to enter the heel portion of the pattern 34 and through the medium of which the pattern is rotated. The dog referred to involves a sleeve-like body member 113 containing a tapering socket 114 at which it fits over, and is keyed to, the spindle with which it cooperates, the sleeve 113 containing a slot 115 in its outer end into which the dog-proper 116 of the device extends and in which it is pivotally supported by means of a pin 117 carried by the sleeve 113. The outer end of the dog is provided with teeth 118 curved, as represented, and the inner end of the dog is provided with the converging faces 119 which oppose adjusting screws 120 threaded in the sleeve 113. The purpose of providing the pivoted dog member 116 is to adapt it to conformingly fit, at its toothed portion, against the heel portion of the pattern, regardless of variations in the curvature of this portion of the pattern, in order that the pattern may be properly alined in the machine.

The tail-stock 101, for the blank 35, which is adjustable toward and away from the head-stock spindle 100, comprises a slide block 121 (Fig. 17) mounted, to slide lengthwise of the frame 36, between the upper and lower front parallel bars 122 and 123 thereof which are provided with upwardly and downwardly extending rack-portions 124 and 125, respectively (Fig. 17), arranged in pairs spaced apart. The slide block 121 is provided at its upper end with an upwardly-extending threaded stud 126 which extends upwardly between the pair of racks 124 and carries a plate 127 slidable up and down thereon and provided at its opposite ends with depending lugs 128 adapted to intermesh, as shown in Fig. 17, with the teeth of both racks 124. The plate 127 contains downwardly-opening recesses 129 at opposite sides of the stud 126, in which coil springs 130, bearing against the upper surfaces of the slide block 121 extend, these springs tending to raise the block 127 out of engagement with the teeth of the rack 124. The upper end of the stud 126 is provided with a nut 131 by which the plate 127 may be rigidly clamped in intermesh with the rack portions 124. A similar locking means is provided at the bottom of the slide block 121 for intermesh with the rack portions 125, these parts being given the same numerals as those applied to the mechanism just described. It will be understood from the foregoing that the slide block 121 may be adjusted along the frame 36 to different positions thereon, as desired, and securely held against displacement thereon by the locking means referred to. The tail-stock for the work also comprises a longitudinally movable bar 132 located in a guide-way 133 in the slide block 121, this bar being provided with a rack 134 which meshes with a gear 135 carried by a shaft 136 terminating in a handle 137 through the medium of which it may be turned for adjusting the bar 132 into different positions lengthwise thereof. The outer end of the bar 132 contains a socket 138 in which the rotary spindle 139 of the tail-stock is rotatably mounted, this spindle being surrounded by a bushing 140 tapered at its forward end, as indicated at 141, at which portion it opposes the tapered collar 142 screwed into the open end of the socket 138 for holding the bushing in place. The spindle 139 is held against withdrawal from the socket, by means of a screw 143 extending into an opening in the wall of the socket 138 and projecting through an opening 144 in the bushing, into a peripheral groove 145 in the spindle 139, the rear end of this spindle, provided with the oil passages 146, bearing against apertured thrust discs 147 in the base of the socket 138 and communicating with an oil passage 148. The outer extremity of the spindle 139 is preferably toothed, as represented at 149, to provide the desired interlocking engagement thereof with the toe end of the blank. Inasmuch as the blanks from which the lasts are made are formed of relatively hard wood, a relatively great squeezing force is required to be exerted by the head and tail-stocks against the ends of the blank in order to properly embed therein the parts which interlock the blank with the head-stock-spindle to secure a positive drive of the blank, without lost motion, it being noted that by the construction just described the desired force for accomplishing the purpose just stated may be effected, inasmuch as the body of the tail-stock, while adjustable, is held rigidly against displacement and great force may be exerted against the spindle 139 through the rack and gear mechanism 134, 135, to shift the spindle to the left in Figs. 1 and 17.

The tail-stock for the pattern last 34 is formed of a slide block 150 located between the bars 122 and 123 of the frame 36 and preferably provided with mechanism, such as that provided in connection with the tail-stock for the blank and hereinbefore described, for holding the slide block 150 in adjusted position lengthwise of the frame 36. The tail-stock now being described also comprises an externally-threaded member 151 (Fig. 16) which has threaded engagement with the threaded opening 152 provided in the slide block 150, the member 151 containing the rotatable spindle 153 for engaging the toe portion of the pattern last 34, the means for rotatably mounting the spindle and preventing displacement of the latter in the member 151, being the same as those described in connection with the spindle 139.

It is desirable that the teeth on both of the head-stocks occupy the same angular position about the axes of their rotation, at the same time, in the rotation of these dogs in the same direction, and accordingly the gear connections between the parts of the mechanism through which these dogs are rotated, is so positioned that the condition above stated exists, the shaft 95 being preferably formed of two alining shaft sections coupled together by a coupling comprising a sleeve-like portion 154 keyed, as represented at 155 (Fig. 13) to the portion of this shaft which is connected with the gear 98 (Fig. 4), a set-screw 156 securing the sleeve 154 against movement relative to this shaft section. The coupling also comprises a collar 157 keyed to the other section of the shaft 95, as represented at 158. The coupling sections 154 and 157 are relatively adjustable about their axes, to permit of the relative adjustment of the shaft sections about their axes, the means shown comprising a series of screws 159 which extend at their threaded ends through arc-shaped slots 160 in the collar 157 and screw into openings 161 in the flanged portion 162 of the sleeve 154, it being understood from the foregoing that upon loosening the screws 159 the sections of the collar may be relatively turned with the shaft sections with which they are connected, and these parts be held in relatively adjusted position by the screws 159.

The swinging frame 36 extends, at all times, during the cutting operation, in forwardly-swung position or, in other words, to the left of the axis of the pivoting shaft 38, in Fig. 2, whereby the pattern 34 is held at all times, in the operation of the machine, against the pattern-follower hereinafter described. In the arrangement shown the frame 36 is connected at its opposite ends with bars 166 (Fig. 2) which, in turn, are pivotally connected, as indicated at 167, with the upper ends of levers 168 connected at their lower ends with the ends of a shaft 169 journaled in the frame of the machine. The levers 168 are pivotally connected between their ends, at 163, with levers 164, pivotally connected at 165, with levers 300 fixed on a shaft 301 journaled in the frame of the machine, the outer ends of the levers 300 being weighted as indicated at 302, and the pivotal connections 165 being at points between the shaft 301 and the weighted ends of these levers. The frame 36 is connected at opposite sides thereof with the upper ends of links 303 the rear ends of which are connected with the forward ends of belts 304 which extend over pulleys 305 fixed on a shaft 306 journaled on the frame of the machine and provided with a sprocket 307 connected by a sprocket-chain 308 with a sprocket 309 secured to the shaft 42, the shaft 306 being thereby rotated in clockwise direction in Fig. 2. The belts 303 extend from the pulleys 305 to pulleys 311 rotatably mounted on shaft 301, and are provided at their free ends with weights 310.

The weighted belt-devices described, by reason of the constantly rotating shaft 306, operate to exert against the swinging frame 36, at all times, a substantially uniform force in a direction to swing the frame in counter-clockwise direction in Fig. 2 and serve to exert a snubbing action on the frame, preventing rebounding of the latter away from the pattern-follower and the cutting mechanism.

The part 302 is sufficiently heavy to counterbalance the frame 36 in its different angular positions but not substantially greater or less than such amount the lever mechanism connected with the swinging frame and above described serving to cause the pattern to bear against the pattern-follower under substantially the same pressure at all times, namely, regardless of the position occupied by the frame 36, it being noted that there is provided between the frame 36 and the levers 300 a system of compound levers, whereby while the frame 36 swings through only a relatively small arc the levers 300 swing through relatively large arcs, in the construction shown through arcs of substantially 90°, which insures practically perfect counterbalancing of the frame 36 in all of the positions to which it moves in the work-cutting operation.

The cutting mechanism of the machine, hereinbefore referred to, comprises, generally stated (Fig. 3), a so-called roughing cutter, represented at 172, and a finishing cutter, represented generally at 173. The roughing cutter 172, in accordance with roughing cutters as commonly provided in this general type of machine, comprises a series of flat-wise-disposed cutter elements 174 of successively increasing diameter, with the teeth of adjacent elements staggered, as shown in Fig. 8, these elements being rigidly mounted on a shaft 175 journaled in a gear case 176 rotatably supported on a drive shaft 177 shown as the armature shaft of a motor 178 rigidly secured to the slide 31, the shaft 177 carrying a gear 179 which meshes at all times with a gear 180 carried on the shaft 175. The finishing cutter 173 comprises a pair of hollow cutters 181 pivotally supported at 182 on oppositely-extending ears 183 provided on the outer end of a shaft 184 journaled in uprights 185 provided on the slide 31 between which the gear case 176 is located, the shaft 184 extending through arc-shaped slots 186 in the gear case 176, and carrying a gear 187 which meshes at all times with the gear 179, it being understood from the foregoing that the gear connections between the drive-shaft 177 and the shafts 175 and 184 operate to drive these shafts simultaneously in the same direction, the gear 187 by preference being of smaller diameter than the gear 180 whereby the shaft 184 is driven at a greater speed than the shaft 175.

The gear-case 176 and shaft 175 are adjustable into different positions on the shaft 177 to vary the positions of the roughing and finishing cutters relative to the work, to regulate the depth of the cut produced by the roughing cutters, the case 176 being provided with a lug 176$^a$ carrying a cross-shaft 176$^b$ extending at its ends in arc-shaped slots 185$^a$ in the uprights 185 and provided with nuts (not shown) bearing against the outer faces of the uprights 185 for holding the gear-case 176 in adjusted position.

The hollow cutters 181 are each of the same construction, but face in opposite directions, each being of general cup-shape with its open end portion of cylindrical form, as represented at 188, the inner surface of these portions, at the outer edges, being chamfered, as represented at 189, to form circular cutting edges.

In order that the desired clearance between the cutters and the blank be presented, the axes of the shafts 175 and 184 are so disposed as to extend at an angle to the axes of rotation of the pattern and blank, as shown in Fig. 3, the angle therein shown being approximately 26°; and the axes of the cutters 181 are disposed at an angle oblique to the axis of the shaft 184, as shown (Fig. 9$^a$), this angle, in the particular illustrated machine, being about 15°, whereby the shape of the cut produced by the cutters 181 is of elliptical contour instead of circular contour as would be produced if the axes of the cutters 181 were at right angles to the axis of the shaft 184. In this connection reference is made to Fig. 19 which shows a portion of the blank and diametrically a portion of one of the cutters, and represents, at 35$^a$, the contour of the cut produced by the cutter, assuming that the blank is pushed against the cutter to produce a deep cut in the blank, it being understood that this is an exaggerated showing merely for the purpose of showing the shape of the cut with the blank and the cutter in the positions therein shown, as the finishing cutters would not cut as deeply into the blank as shown in this figure. The arrangement just described not only provides adequate clearance for the roughing cutters, but also provides sufficient clearance for the finishing cutters even when provided in the form of cylinders, as shown and hereinbefore explained. The angularity of the finishing cutters, relative to the axis of the blank, whereby the elliptical cut is produced, as stated, is clearly shown at the right hand side of Fig. 20, the cutter 181 therein shown being viewed in plan.

The provision of the cutter 181 of the form shown, is of great advantage as the same may be repeatedly sharpened without varying the diameter of its cutting edge, and thus the contour of the cut produced is of nonvarying form.

The pattern-follower hereinbefore referred to is represented at 190, the follower being in the form of a circular body journaled on a shaft 191 carried by the slide 33, the shaft 191 extending parallel with the shafts 175 and 184. In the operation of the machine the pattern 34 bears at all times against the periphery of the pattern-follower 190, the cross-sectional shape of the periphery of which, where it engages the pattern, is the same as the shape of the cut produced by the cutters 181, or, in other words, corresponds with the contour of the cutting edge of the cutter 181 when viewing it in plan, as clearly shown at the left hand side of Fig. 20. By so shaping the pattern follower, the cutters 181 operate to produce a last which is an accurate production of the pattern-last, whether or not the machine is set for producing graded lasts, as distinguished from a machine wherein the cross-sectional shape of the pattern-follower 190 is circular, in which latter case pronounced errors in the circumferential measurements of the last would be produced at the time of engagement of the pattern-follower with the more or less abruptly-disposed portions of the pattern.

In the operation of the machine the pattern-follower and cutting mechanism is slowly moved to the left in Figs. 1 and 3, in engagement with the pattern and blank, the mechanism shown for this purpose comprising a shaft 192 journaled in a bearing 193 which has slight rocking movement in a vertical plane on the frame of the machine in a manner well known in the art, one end of this shaft carrying pulleys 194 connected, by a belt 195, with pulleys 196 secured to the shaft 42. The other end of the shaft 192 carries a worm 197 which meshes with a worm wheel 198 secured to a shaft 199 journaled on the frame of the machine, this shaft carrying a pinion 200 which meshes with a gear 201 provided on a shaft 202 journaled on the frame of the machine and meshing with a rack depending from the slide 31, the parts being so constructed and arranged that when the worm 197 meshes with the worm wheel 198, the slide 31 will be driven from the shaft 192 to the left in Figs. 1, 3 and 10, and through the medium of the lever mechanism hereinbefore described and connecting the slide 31 with the slide 32, the latter will be simultaneously moved in the same direction with the slide 31, at the same speed or at a different speed therefrom, depending upon the setting of the lever mechanism. Associated with the shaft 192 is mechanism operating to automatically arrest the feeding of the slides 31 and 32, upon the conclusion of the last-turning operation and before the cutters 181 reach a position wherein they would strike a part of the machine and thereby become damaged, this mechanism comprising a vertically-movable bar 203 slidable in a guide bar 204 rigid with the frame of the machine, the bar 203 being pivotally connected, at 205, with a bearing 206 in which the outer end of the shaft 192 is journaled. A spring 207 supported at one end, as indicated at 208, on the frame of the machine, bears at its free end against the upper end of the bar 203 and tends normally to rock the shaft 192 to a position in which the worm 197 is out of mesh with the worm wheel 198, the bar 203 being movable upwardly against the action of the spring 207, by a hand lever 209 pivotally connected between its ends, as represented at 210, to a stationary part of the machine and engaging, at a rearwardly-directed extension on one end thereof, in a recess in the side of the bar 203 (Fig. 10). The mechanism referred to also comprises a slide bar 211 mounted on the frame of the machine and guidingly confined thereon for lengthwise movement in guides 212 on the frame, one end of the bar 211, the left hand end in Fig. 10, carrying a block 213 adapted to be engaged by a tappet 214 carried by the slide 31. The slide bar 211 is also provided with a lateral projection 215 overlapping the upper, free, end of a leaf spring 216 rigidly secured at its lower end to a stationary part of the machine, this spring tending to shift the bar 211 to the right in Fig. 10. The slide bar 203 contains a laterally-opening notch 217 which, when the bar 203 is raised to a position in which the worm 97 meshes with the worm wheel 98, registers with the projection 215 which latter enters this notch, under the action of the spring 216.

The operator, to set the machine for producing the feeding movement, swings the lever 209 in clockwise direction to raise the bar 203 to the position shown in Fig. 10, against the action of the spring 207, in which position the spring 216 forces the bar 211 to the position shown in Fig. 10, the projection 215 entering the notch 217 and holding the shaft 192 in raised position, whereby the slides 31 and 32 are fed to the left in Figs. 1 and 3. At the conclusion of the cutting operation the tappet 214 strikes the block 213 and shifts the bar 211 to the left in Fig. 10, thereby withdrawing the projection 215 from the notch 217 and permitting the spring 207 to force the shaft 192 to a position in which the worm 197 is out of mesh with the wheel 198, whereupon the feeding operation discontinues. It will be noted in this connection that by providing the mechanism just described no adjustment of the same is required in the adjusting of the machine for producing longer or shorter lasts.

It is desirable in a machine of this character that the driving mechanism for the head-stocks be automatically stopped at such a point in their rotation that the teeth on the dogs will extend in a predetermined angular position relative to their axes, preferably vertically, the machine shown also comprising mechanism for this purpose and involving a clutch disc 218 splined at 219 on the shaft 42 and cooperating by means of clutch lugs thereon, one of which is represented at 220, with a sleeve 221 rotatably mounted on the shaft 42 and rigidly connected with a worm wheel 222 meshing with a worm 223 on the armature shaft of the motor 43, the end of the sleeve 221 adjacent the clutch sleeve 218 containing notches one of which is represented at 224, for receiving the clutch lugs 220. The arrangement is such, as described, that when the clutch is in the position shown in Fig. 18, the sleeve 221 is disengaged from the shaft 42 and the shaft 42 is at rest, but when the clutch sleeve 218 is moved to the right in Fig. 18 to engage by means of its clutch lugs 220 with the notched portion of the sleeve 221, the shaft 42 is in driving engagement with the motor 43. The clutch sleeve 218 cooperates with a shifting lever 225 engaging at its yoke-shaped upper end 226 with the peripherally grooved portion 227 of the sleeve, this lever being pivoted, as indicated at 228, to a stationary part of the machine and connected at its lower end with a coil spring 229 fastened to the frame of the machine and tending to force the sleeve 218 into clutching position. The position of the lever 225 is controlled by a pin 230 slidably mounted in the frame of the machine and extending into the path of movement of a cam 231 provided on the rear end of a bar 232 slidably supported in a bracket 233 on one of the uprights 29 of the machine, the cam 231 in the position of the lever as shown in Figs. 2 and 18 bearing against the outer end of the pin 230 and causing the lever 225 to be in a position in which the sleeve 218 is unclutched from the rotating sleeve 221. The bar 232 contains in its forward end a slot 234 extending lengthwise thereof, and into this slot extends a pin 235 provided on the outer end of a lever 236 secured to one end of a shaft 237 journaled in one of the side members 37 of the swinging frame, the other end of this shaft carrying a lever 238 to the outer end of which the lower end of a link 239 is pivoted, as represented at 240, the upper end of this link being pivotally connected with a crank-pin 241 carried by the shaft 38. The member 30 of the frame of the machine carries a link 242 (Fig. 2) pivotally connected thereto, as represented at 243, the forward end of this link being in the form of a hook 244 adapted to hook over a pin 245 on the swinging frame 36, this link serving to hold the swinging frame 36 in outwardly swung position when swung outwardly by the operator, in which position the pattern and blank are out of engagement with the pattern follower and cutting mechanism. It will be understood that during the operation of the machine the shaft 237 is continuously oscillated, the pin 235 riding idly in the slot 234. As soon, however, as the operator has swung the frame 36 to the position shown in Fig. 2, the lever 236, as it nears the limit of its movement forwardly, namely, while swinging in clockwise direction, engages the front wall of the slot 234 and shifts the lever 232 to the left in Fig. 2 sufficiently far to move the pin 230 to the position shown in Fig. 18, whereupon the shaft 42 is disengaged from the motor 43 and thus the head-stocks for the pattern and blank come to rest. When it is again desired to condition the frame 36 for cooperation of the last and blank therein with the follower and cutting mechanism, the latch lever 242 is swung upwardly to disengage it from the pin 245, and the operator pushes the bar 232 rearwardly to permit the spring 229 to throw in the clutch sleeve 218. The parts of the apparatus are so constructed and arranged that following the outward swinging of the frame by the operator, as stated, the unclutching of the shaft 42 from the driving sleeve 221 will take place when the shaft 38 is in a predetermined position, a position in which the teeth on the spindles of the head-stocks are in vertical position.

In connection with the provision of the scale 51 on the bar section 47, it may be stated that, in the manufacturing of graded shoe lasts, it is required that the lasts produced correspond in length with the length of flexible sole patterns when deflected into a condition in which they conform with the curvature of the bottom surfaces of the lasts, these flexible flat patterns being graded for different sizes of lasts in flat condition. As the lathe grades along a straight line from the toe to the heel of the last, it will be readily apparent that where the curvature of the under side of the last varies, and particularly where it varies greatly, as in the case of some lasts for women's shoes, the length of the last produced by grading along the straight line, as suggested, will not produce a last of a length corresponding with the length of the flexible pattern of that particular grade, when deflected to conform to the curvature presented by the under surface of the last, and as the variation referred to occurs wherever the change of curvature of the under side of the last exists, it is impossible to produce the proper graded last on the machine without making certain corrections in the adjustments of the machine for different lengths of lasts. Referring to Fig. 1, as hereinbefore stated, the arrangement of the parts 45, 54, 55 and 59 is the same as that in common use, as also the scale 60 on the member 59 and the scale 55ᵇ on the link 55. In accordance with prior practice, the pivoted connection 57 for the bar 55 is set on the bar 59 at a point on the scale 60 corresponding with the particular length of pattern last, and the bar 54 is slidably adjusted on the bar 55 to a point on the scale 55ᵇ corresponding to the difference in length between the pattern last and the last to be produced, the adjustment so made conditioning the machine for turning the last graded along a straight line from the extreme end of the toe to the extreme end of the heel.

However, as the last produced must correspond in length with the particular flexible sole pattern corresponding with the size of last to be produced, when this flexible pattern is deflected into the curved condition corresponding with the under side of the last, the adjusting of the machine as just described does not result in the production of a last of the desired length. Thus it is necessary that the correction above referred to be made, and this is done, in accordance with prior practice, by a cut-and-try method involving the turning of a last to determine how much correction should be made and thereafter readjusting the slide 54 on the bar 55 to make the correction. Inasmuch as the adjustment for error in the length of last produced has been effected between the bars 54 and 55, which is the adjustment for the making of different lengths of lasts from a given pattern last, it is necessary, in accordance with the prior practice referred to, to determine by a cut-and-try method the amount of correction for each different length of last to be produced. In other words, whenever it is desired to produce a last graded to a different length than the one previously produced, from the same pattern last, it is necessary to determine the amount of correction to be made by the cut-and-try method. In my improved machine, adjustment of the machine for the error above referred to is made only once for any given shape of pattern last, regardless of the number of different lengths of lasts produced on a machine. In other words, when the adjustment for error is once made as to any particular shape of pattern last, that adjustment remains untouched in the making of all lengths of lasts from this same model, it being understood, of course, that for different lengths of lasts the bar 54 would be adjusted relative to the bar 55 in accordance with the scale 55ᵇ. The elimination of the cut-and-try method for making the correction as above noted for each different length of last, results from the provision on one of the sections of the bar 45, of a suitable scale, shown as on the bar section 47, and a pointer marking on the other section of this bar, and the varying of the initial adjustment of the pivot 57 in accordance with the correction to be made as indicated on the scale 51. In the use of the machine shown the bar 55 is adjusted on the bar 59 and the bar 54 is adjusted on the bar 55 as noted above, in accordance with common practice in the initial setting of the machine. A last is then turned, and the graded pattern corresponding with the length of last produced is applied to the under surface of the last to flatwise contact therewith throughout its length, and the difference between the length of the last along its curved under surface from end to end and the length of the flexible sole pattern in the position in which it is applied to the last, as stated, is noted, the bar portions 46 and 47 being in such position that the pointer 52 and the zero marking on the scale 51 are in registration, in which position the pattern-follower and the cutter mechanism, when the slides on which they are carried extend to the extreme left position in Fig. 1, are disposed in the desired positions relative to the heel portion of the last and the corresponding portion of the work 35. The operator then loosens the set-screw 50 (Figs. 1 and 11) and the clamping screw 57 and slides this clamping pivot up or down on the bar 59 depending upon whether a longer or a shorter last is to be produced to make the correction, to such a point on the bar 59 that the zero marking 52 on the bar section 46 will register with that mark on the scale 51 which corresponds to the correction in length to be made, the operator then tightening the clamping pivot 57 and re-adjusting the bar sections 46 and 47 relative to each other so that the slides carrying the pattern-follower and cutting mechanism will be spaced the desired distance apart. By way of example it may be stated that the graduations on the scale 51 may be the same as those on the last-stick. Thus if the trial last produced be found to be one-half size too short, by way of example, the operator, in making the correction for adjustment, will raise the clamping pivot 57 to such a point that the zero pointer 52 in Fig. 11 will register with the first half size marking at the left of the zero on the scale 52 in Fig. 11, and if the trial last is found to be too long, say by one-half size, the operator, instead of adjusting the pivot 57 upwardly will adjust it downwardly until the first half size graduation at the right of the zero of the scale 51 is in line with the zero pointer marking 52. It will be understood, however, that any other suitable markings may be provided, in place of the scale 51.

It will be noted from the foregoing that inasmuch as the correction referred to is not made by disturbing the adjustment of the bar 54 on the bar 55, but is made at the pivotal connection of the bar 55 with the bar 59, or, in other words, the ratio of grading is changed, to establish the proper ratio of grade for a last, the under surface of which is of a given curvature, the error thus corrected is corrected for any and all lengths of lasts produced from the same model, it of course being understood that where a longer or a shorter last, as compared with the one previously turned, is to be produced, the bar 54 is required to be adjusted on the bar 55 in accordance with the scale 55$^b$ thereon.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In a last lathe, the combination of a support, a driving shaft journaled on said support, a swing frame pivoted to swing about the axis of said shaft, work and pattern rotating means carried by the swing frame, a driving element carried by said driving shaft, a driven element fixed to said support, a universal joint centered in the axis of said shaft and driven by said driven element, and means for driving said rotating means through said universal joint.

2. In a last lathe, the combination of a support, a driving shaft journaled on said support, a swing frame pivoted to swing about the axis of said shaft, work and pattern rotating means carried by the swing frame operating to drive said work and pattern in the same direction or in opposite directions relative to each other, a driving element carried by said driving shaft, a driven element fixed to said support, a universal joint centered in the axis of said shaft and driven by said driven element, and means for driving said rotating means through said universal joint.

3. In a last lathe, the combination of a support, a driving shaft journaled on said support, a swing frame pivoted to swing about the axis of said shaft, work and pattern rotating means carried by the swing frame, a driving element carried by said driving shaft, a driven element fixed to said support and disposed at an angle to said driving element, a universal joint centered in the axis of said shaft and driven by said driven element, and means for driving said rotating means through said universal joint.

4. In a last lathe, the combination of a support, a driving shaft journaled on said support, a swing frame pivoted to swing about the axis of said shaft, work and pattern rotating means operating to drive said work and pattern in the same direction or in opposite directions relative to each other, a driving element carried by said driving shaft, a driven element fixed to said support and extending at an angle to said driving element, a universal joint centered in the axis of said shaft and driven by said driven element, and means for driving said rotating means through said universal joint.

5. In a last lathe, the combination of a support, a driving shaft journaled on said support, a swing frame pivoted to swing about the axis of said shaft, work and pattern rotating means comprising intermeshed gears carried by the swing frame, a driving element carried by said driving shaft, a driven element fixed on said support, a universal joint centered in the axis of said shaft and driven by said driven element, and means connecting said universal joint with said gears on said swing frame.

6. In a last lathe, the combination of a support, a driving shaft journaled on said support, a swing frame pivoted to swing about the axis of said shaft, work and pattern rotating means carried by the swing frame, a driving gear carried by said driving shaft, a driven gear fixed to said support and meshing with said driving gear, a universal joint centered in the axis of said shaft and driven by said driven gear, and means for driving said rotating means through said universal joint.

7. In a lathe, the combination of a support, a frame pivoted thereto to have swinging movement, a pattern follower and a cutting device on said support, means for rotatably supporting a pattern and work on said frame, means for so counterbalancing the pivoting frame as to avoid the uneven action of gravity thereon, and means other than the weight of said frame tending to exercise a uniform pressure in one direction upon the swing frame.

8. In a lathe, the combination of a support, a depending frame pivoted thereto to have swinging movement, a pattern follower and a cutting device on said support, means for rotatably supporting a pattern and work on said frame, and means cooperating with said frame for causing the pattern on said frame to press against said follower with the same, or substantially the same, force regardless of the angle to which the frame is swung.

9. In a lathe, the combination of a support, a depending frame pivoted thereto to have swinging movement, a pattern follower and a cutting device on said support, means for rotatably supporting a pattern and work on said frame, and a counterweight on said frame, so constructed and arranged as to cause the pattern on said frame to press against said follower with the same, or substantially the same, force regardless of the angle to which the frame is swung.

10. In a lathe, the combination of a support, a frame pivoted thereto to have swinging movement, a pattern follower and a cutting device on said support, means for rotatably supporting a pattern and work on said frame, and snubbing means for said frame comprising a positively-driven pulley, a flexible element connected with said frame and engaging said pulley, and means exerting force on said element in a direction to swing said frame toward said follower and cutting device, said pulley rotating in a direction to exert a force on said element in the same direction as said last-named means.

11. In a lathe, the combination of a support, a frame pivoted thereto to have swinging movement, a pattern follower and a cutting device on said support, means for rotatably supporting a pattern and work on said frame, snubbing means for said frame comprising a positively-driven pulley, a flexible element connected with said frame and engaging said pulley, and means exerting force on said element in a direction to swing said frame toward said follower and cutting device, said pulley rotating in a direction to exert a force on said element in the same direction as said last-named means, and counterbalancing means for said frame.

12. In a lathe, the combination of a support, a frame pivoted thereto to have swinging movement, a pattern follower and a cutting device on said support, means for rotatably supporting a pattern and work on said frame, snubbing means for said frame comprising a positively-driven pulley, a flexible element connected with said frame and engaging said pulley, and means exerting force on said element in a direction to swing said frame toward said follower and cutting device, said pulley rotating in a direction to exert a force on said element in the same direction as said last-named means, a counterweighting device, and power-compounding mechanism interposed between said device and said frame.

13. In a lathe, the combination of a support, a frame pivoted thereto to have swinging movement, a pattern follower and a cutting device on said support, means for rotatably supporting a pattern and work on said frame, snubbing means for said frame comprising a positively-driven pulley, a flexible element connected with said frame and engaging said pulley, and means exerting force on said element in a direction to swing said frame toward said follower and cutting device, said pulley rotating in a direction to exert a force on said element in the same direction as said last-named means, a counterweighting device, and power-compounding mechanism interposed between said device and said frame, said lever in the movement of said frame from one extreme position to its opposite extreme position during the operation of the machine, moving through an arc of substantially 90° from substantially horizontal position to substantially vertical position, and vice versa.

14. In a lathe, the combination of a support, a frame pivoted thereto to have swinging movement, a pattern follower and a cutting device on said support, means for rotatably supporting a pattern and work on said frame, and snubbing means for said frame comprising a positively-driven pulley, a flexible element connected with said frame and engaging said pulley, means engaged by said flexible element in position to cause said element to engage with at least one-half of the periphery of said pulley, and means exerting force on said element in a direction to swing said frame toward said follower and cutting device, said pulley rotating in a direction to exert a force on said element in the same direction as said last-named means.

CHARLES E. REED.